United States Patent [19]

Thaler et al.

[11] Patent Number: 5,627,259

[45] Date of Patent: May 6, 1997

[54] AMIDATION OF ESTER FUNCTIONALIZED HYDROCARBON POLYMERS

[75] Inventors: Warren A. Thaler, Flemington; Stephen Zushma, Clinton; Joseph V. Cusumano, Watchung; David C. Dankworth, Whitehouse Station; William D. Diana, Belle Mead; William B. Eckstrom, Fanwood, all of N.J.; Jacob I. Emert, Brooklyn, N.Y.; Keith R. Gorda, Little York, N.J.; Antonio Gutierrez, Mercerville, N.J.

[73] Assignee: Exxon Chemical Patents Inc., Linden, N.J.

[21] Appl. No.: 563,518

[22] Filed: Nov. 28, 1995

Related U.S. Application Data

[63] Continuation of Ser. No. 261,507, Jun. 17, 1994, abandoned.

[51] Int. Cl.$^6$ .............................. C08F 20/10; C08G 69/26
[52] U.S. Cl. .......................... 528/342; 528/345; 528/348; 526/272; 526/318.4; 526/318.6
[58] Field of Search .................................. 528/342, 345, 528/348; 526/272, 318.4, 318.6

[56] References Cited

U.S. PATENT DOCUMENTS

| | | | |
|---|---|---|---|
| 3,219,666 | 11/1965 | Norman et al. | 544/383 |
| 3,444,170 | 5/1969 | Norman et al. | 544/383 |
| 3,932,476 | 1/1976 | Bergeron | 554/69 |
| 4,206,143 | 6/1980 | Wenzel et al. | 260/562 |
| 4,321,411 | 3/1982 | Nakamura et al. | 564/135 |
| 4,614,815 | 9/1986 | Cognigni et al. | 528/292 |
| 5,229,022 | 7/1993 | Song et al. | 252/56 R |

FOREIGN PATENT DOCUMENTS

| | | |
|---|---|---|
| 3048020 | 12/1980 | Germany. |
| 49082619 | 12/1972 | Japan. |
| 801665 | 7/1979 | U.S.S.R.. |

OTHER PUBLICATIONS

D. F. DeTar and C. Delahunty, "Ester Aminolysis: New Reaction Series for the Quantitative Measurement of Steric Efffects," J. Am. Chem. Soc., vol. 105, pp. 2734–2739 (1983).

J. M. Bobbitt and D. A. Scola, "Synthesis of Isoquinoline Alkaloids. II. The Synthesis and Reactions of 4–Methyl–3–pyridinecarboxaldehyde and Other 4–Methyl–3–substituted Pyridines" J. Org. Chem., vol. 25, pp. 560–564 (1960).
World Patents Abstract No. 59634E/29 (DE 3048–020), Jul. 1982.
L. G. Wade, Jr., "Compendium of Organic Synthetic Methods," vol. 5, Wiley Interscience, p. 183 and pp. 239–240, (1984).
S. R. Sandler and W. Karo, "Organic Functional Group Preparations," Academic Press (1968), pp. 286–287.
R. C. Knowlton et al., "Acyl–Substituent Effects on Ester Aminolysis" J. Org. Chem., vol. 53, pp. 3862–3865 (1988).
I. T. Harrison and S. Harrison, "Compendium of Organic Synthetic Methods," Wiley–Interscience, p. 289, (1974).
I. T. Harrison and S. Harrison, "Compendium of Organic Synthetic Methods," vol. 2, Wiley–Interscience, p. 87 (1974).
L. S. Hegedus and L. Wade, "Compendium of Organic Synthetic Methods," vol. 3, Wiley–Interscience, p. 189, (1977).

Primary Examiner—James J. Seidleck
Assistant Examiner—P. Hampton-Hightower
Attorney, Agent, or Firm—Kenneth R. Walton

[57] ABSTRACT

The present invention is directed to a process for preparing a polymeric amide which comprises the steps of:

(A) reacting a mixture of (i) functionalized hydrocarbon polymer containing ester functional groups comprising at least one member selected from the group consisting of substituted alkyl ester functional groups, the substituted alkyl moiety containing at least one electron withdrawing substituent group, and aryl ester functional groups, the hydrocarbon polymer having a number average molecular weight of at least about 500 prior to functionalization, and (ii) an amine having at least one reactive —NH$_2$ moiety, for a time and under conditions sufficient to form amide groups; and (B) removing from the mixture during step (A) hydroxyl compound released from the ester functional groups in forming the amide groups.

The polymeric amides so produced are useful as fuel additives (e.g., detergents) and lubricating oil additives (e.g., dispersants).

20 Claims, 5 Drawing Sheets

AMIDATION OF ESTER FUNCTIONALIZED HYDROCARBON POLYMERS

This is a continuation of application Ser. No. 08/261,507, filed Jun. 17, 1994 now abandoned.

FIELD OF THE INVENTION

The invention relates to a process for preparing polymeric amides by reaction of ester functionalized hydrocarbon polymers with amines having at least one reactive primary amine group, with concurrent removal of the hydroxy compound released during amide formation. The polymeric amides produced by the process are useful as additives in fuels and lubricating oils.

CROSS REFERENCE TO RELATED APPLICATIONS

This application is related to commonly assigned, copending U.S. Ser. No. 992,403, filed Dec. 17, 1992, and entitled "Functionalization of Polymers Based on Koch Chemistry and Derivatives Thereof". U.S. Ser. No. 992,403 discloses the functionalization of polymers containing at least one carbon-carbon double bond via a Koch reaction to form a carboxylic acid, carboxylic ester, or thiol ester at the point of unsaturation. The derivatization of the Koch-functionalized polymers by reaction with an amine to form an amide is also disclosed.

U.S. Ser. No. 08/261,557 filed Jun. 17, 1994, now abandoned, Attorney Docket Number PT-1144, Prestripped Polymer Used to Improve Koch Reaction Dispersant Additives; U.S. Ser. No. 08/261,559, Attorney Docket Number PT-1145, Batch Koch Carbonylation Process; U.S. Ser. No. 08/261,534, Attorney Docket Number PT-1146, Derivatives of Polyamines With One Primary Amine and Secondary or Tertiary Amines; U.S. Ser. No. 08/261,560, Attorney Docket Number PT-1149, Continuous Process for Production of Functionalized Olefins; U.S. Ser. No. 08/261,554, Attorney Docket Number PT-1150, Lubricating Oil Dispersants Derived for Heavy Polyamines; and U.S. Ser. No. 08/261,558, Attorney Docket Number PT-1151, Functionalized Additives Useful in Two-Cycle Engines, all filed Jun. 17, 1994, and all pending all contain related subject matter as indicated by their titles and are hereby incorporated by reference in their entirety for all purposes.

BACKGROUND OF THE INVENTION

It is known to amidate polymers containing ester functional groups by heating the functionalized polymer with an amine. For example, U.S. Pat. No. 3,444,170 discloses the reaction of a high molecular weight carboxylic compound and an amine by heating the two reactants at a temperature above 80° C. to produce products having predominantly amide, imide or amidine linkages. It is disclosed that the high molecular weight carboxylic reactants may be esters which can be prepared by reaction of a halogenated olefin polymer and an ester of an alpha, beta-unsaturated monocarboxylic acid. The esters can be phenolic esters derived from the unsaturated monocarboxylic acid and phenol, alkyl phenols, and alkyl napnthols.

SUMMARY OF THE INVENTION

The present invention is a process for preparing a polymeric amide which comprises the steps of: (A) reacting a mixture of (i) functionalized hydrocarbon polymer containing ester functional groups comprising at least one member selected from the group consisting of substituted alkyl ester functional groups, the substituted alkyl moiety containing at least one electron withdrawing substituent group, and aryl ester functional groups, the hydrocarbon polymer having a number average molecular weight of at least about 500 prior to functionalization, and (ii) an amine having at least one reactive —$NH_2$ moiety, for a time and under conditions sufficient to form amide groups; and (B) removing from the mixture during step (A) hydroxy compound released from the ester functional groups in forming the amide groups.

In one preferred embodiment, at least 50 mole % of the ester functional groups in the functionalized hydrocarbon polymer are neo ester functional groups, and the amine comprises at least one heavy alkylene polyamine, as hereinafter defined.

By removing the hydroxy compound released as a byproduct of amide formation during the reaction, versus separating the byproduct from the polymeric amide in a post-reaction step, the process of the invention achieves significantly higher conversions at shorter reaction times than otherwise possible. The benefits achieved by the process of the invention are both surprising and unexpected, because it has been observed that the amidation reaction is not reversible (and thus the removal of hydroxy compound is not merely shifting the equilibrium of a reversible reaction to favor amide formation) nor is it retarded by the hydroxy compound acting as an acid toward the amine reactant (and thus it appears that the hydroxy compound is not simply reducing the amount of free amine available for amidation by forming acid-base complexes with the amine).

DETAILED DESCRIPTION OF THE INVENTION

The functionalized hydrocarbon polymer useful as a reactant in the process of the invention can be any hydrocarbon polymer which has been functionalized to contain within its structure ester functional groups, wherein the hydrocarbon polymer prior to functionalization has a number average molecular weight ("$\overline{M}_n$") of at least about 500, preferably from about 500 to 20,000 (e.g., 1,000 to 20,000), more preferably from about 500 to 15,000 (e.g., 700 to 10,000), and most preferably from about 1,000 to 10,000 (e.g., 1,500 to 5,000). $\overline{M}_n$ can be determined by several known techniques such as size exclusion chromatography (also known as gel permeation chromatography ("GPC")), vapor phase osmometry, proton NMR and carbon 13 NMR. GPC provides molecular weight distribution ("MWD"), also referred to as polydispersity, which is determined by the ratio of weight average molecular weight ("$\overline{M}_w$") to $\overline{M}_n$. MWD is not a critical aspect of the starting hydrocarbon polymer for the process of this invention. Typically, however, the hydrocarbon polymers have MWD of less than about 6.

The starting hydrocarbon polymers are preferably olefin polymers comprising a major molar amount of $C_2$ to $C_{28}$, e.g., $C_2$ to $C_5$, monoolefin. The polymers can be homopolymers such as polypropylene and polyisobutylene or copolymers such as ethylene-propylene copolymer, ethylene-butene-1 copolymer, butene-1-propylene copolymer, etc. Other copolymers include those in which a minor molar amount of the monomers, e.g., 1 to 10 mole %, is a $C_4$ to $C_{18}$ non-conjugated diolefin, such as EPDM. EPDM copolymers include copolymers of ethylene and propylene with dicyclopentadiene, with ethylidene norbornene and with 1,4-hexadiene.

As defined herein, the term hydrocarbon polymers also includes polymers containing non-hydrocarbon moieties such as lower alkoxy, lower alkyl mercapto, hydroxy, mercapto and carbonyl, provided that the non-hydrocarbon moieties do not substantially interfere with the functionalization of the hydrocarbon polymer with ester groups nor with the amidation reaction encompassed by the process of the invention. When present, such substituted hydrocarbon groups normally will not contribute more than about 10 wt. % of the total weight of the hydrocarbon polymers. Consequently, it is apparent that where the hydrocarbon polymer is an olefin polymer, the olefin and diolefin monomers from which the polymer is prepared can also contain such substituents.

The starting hydrocarbon polymer is preferably unsaturated; i.e., contains at least one carbon-carbon double bond, wherein the unsaturation can be terminal, internal or both. The presence of unsaturation in the hydrocarbon polymer is advantageous, because it can facilitate the functionalization of the polymer with ester groups. For example, the Koch reaction, which is a useful method for introducing ester groups into hydrocarbon polymers, relies upon the presence of carbon-carbon double bonds to achieve functionalization. Ester functionalization by the Koch reaction is described more fully below.

Accordingly, particularly suitable hydrocarbon polymers are alpha-olefin homopolymers, copolymers of alpha-olefin comonomers, and copolymers of ethylene and alpha-olefin comonomers, wherein the polymer contains at least some terminal and/or internal unsaturation. The unsaturated alpha-olefin homo- and copolymers are polymers of at least one $C_3$ to $C_{28}$ alpha-olefin having the formula $H_2C=CHR^1$ wherein $R^1$ is straight or branched chain alkyl radical comprising 1 to 26 carbon atoms. The unsaturated ethylene-alpha-olefin copolymers are polymers of ethylene and at least one alpha-olefin of the above formula, wherein $R^1$ is preferably alkyl of from 1 to 18 carbon atoms, and more preferably is alkyl of from 1 to 8 carbon atoms, and most preferably from 1 to 2 carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and ethylene and butene-1. The copolymers may, optionally, contain a minor amount, e.g., 0.5 to 5 mole % of a $C_4$ to $C_{18}$ non-conjugated diolefin comonomer.

The molar ethylene content of the unsaturated ethylene copolymers employed in this invention is preferably in the range of 20 to 80%, and more preferably 30 to 70%. When propylene and/or butene-1 are employed as comonomer(s) with ethylene, the ethylene content of such copolymers is most preferably between 45 and 65%, although higher or lower ethylene contents may be present.

The unsaturated alpha-olefin homopolymers, alpha-olefin copolymers and ethylene-alpha-olefin copolymers preferably have a high degree of terminal ethenylidene unsaturation, wherein at least about 30% of the polymer chains possess terminal ethenylidene unsaturation. Preferably, at least 50%, more preferably at least 60%, and most preferably at least 75% (e.g., 75–98%), of such polymer chains exhibit terminal ethenylidene unsaturation. The percentage of polymer chains having terminal unsaturation may be determined by proton or carbon 13 NMR.

The unsaturated hydrocarbon polymers with high terminal unsaturation (e.g., up to 95% or more terminally unsaturated polymer chains) may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Suitable methods for preparing these polymers are disclosed in, for example, U.S. Pat. No. 5,266,223 and U.S. Pat. No. 5,225,092. Ethylene copolymers of this latter type, which are preferred copolymers for use in the invention, may be characterized by the formula POLY—$C(R^2)$=$CH_2$ wherein $R^2$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl (e.g., methyl or ethyl), and wherein POLY represents the polymer chain. The chain length of the $R^2$ alkyl group will vary depending on the comonomer(s) selected for use in the polymerization. A minor amount of the polymer chains can contain terminal ethenyl (i.e., vinyl) unsaturation, i.e., POLY—CH=$CH_2$, and a portion of the polymers can contain internal monounsaturation, e.g., POLY—CH=$CH(R^2)$, wherein $R^2$ is as defined above.

The ester functional group introduced into the hydrocarbon polymer by functionalization is at least one member selected from the group consisting of substituted alkyl ester functional groups and aryl ester functional groups. The substituted alkyl ester functional group has the formula (I)

wherein Ak represents a substituted alkyl group which is a linear or branched alkyl group containing at least one electron withdrawing substituent group, and preferably at least two electron withdrawing substituent groups. The alkyl group is preferably $C_2$ to $C_{10}$ alkyl, more preferably $C_2$ to $C_8$ alkyl, and most preferably $C_2$ to $C_4$ alkyl. The electron withdrawing substituent groups are preferably halogen, more preferably F or Cl or combinations thereof, and most preferably F. Other electron withdrawing substituent groups, such as $NO_2$ or CN, are also suitable, both independently and in combination with halogen groups and/or with each other.

The substituent alkyl group Ak can contain electron withdrawing substituent groups on any one of the carbon atoms of the alkyl group, or all of the carbon atoms, or any combination thereof, provided that the corresponding alcohol H—O—Ak is chemically stable under the conditions employed in the process of the invention.

In a preferred embodiment, Ak represents an alkyl group containing at least one primary or secondary carbon atom in a position beta to the ester moiety, wherein the beta carbon atom has at least one electron withdrawing substituent group (e.g., fluorine). In other words, Ak contains at least one electron withdrawing substituent group on a carbon atom once removed from the ester moiety. More preferably, the primary or secondary beta carbon atom contains more than one electron withdrawing substituent group. In this embodiment, where Ak contains two or more primary or secondary beta carbon atoms, at least one of the beta carbon atoms contains at least one, and preferably more than one, electron withdrawing substituent group. Preferably, each of the beta carbon atoms contains at least one, and preferably more than one, electron withdrawing substituent group. Most preferably each beta carbon atom present in Ak; i.e., the substituted alkyl group, is fully substituted with electron withdrawing groups.

In view of the foregoing, it is clear that the preferred substituted alkyl groups represented by Ak are haloalkyl groups, especially polyhaloalkyl groups (e.g., polychloroalkyl and polyfluoroalkyl groups), and most especially polyfluoroalkyl groups. Particularly preferred polyhaloalkyl groups are those having at least one, and preferably more than one, halogen substituent on the beta carbon atom (or atoms) in the alkyl group. Suitable polyhaloalkyl groups include, but are not limited to, 2,2-difluoroethyl, 2-2-2-trifluoroethyl, 2,2-dichloroethyl, 2,2,2-trichloroethyl, 1,1,1-trifluoroisopropyl, 1,1,1,3,3,3-hexafluoroisopropyl (hereinafter more simply referred to as hexafluoroisopropyl), 2,2,3,3,3-pentafluoropropyl, 2-methylhexafluoro-2-propyl and 2-trifluoromethylhexafluoro-2-propyl. A particularly preferred polyhaloalkyl group is hexafluoroisopropyl. Accordingly, a particularly preferred polyhaloalkyl ester functional group is hexafluoroisopropyl ester.

The aryl ester functional group introduced by functionalization into the hydrocarbon polymer has the formula (II)

$$-\overset{O}{\underset{\|}{C}}-O-Ar \qquad (II)$$

wherein Ar represents an aryl group which is an aromatic radical or a substituted aromatic radical. Illustrative aryl groups are phenyl, substituted phenyl, naphthyl, and substituted naphthyl.

Generally speaking, the substituted alkyl group and the aryl group are selected such that, upon amidation of the ester functional group by the process of the invention, the hydroxy compound released from the ester (i.e., H—O—Ak or H—O—Ar) has a $pK_a$ in water at room temperature of less than 12, preferably less than 10 and more preferably 8 or less. The $pK_a$ of the released compound is a measure of how readily the functionalized hydrocarbon polymer will react to form a polymeric amide.

The hydrocarbon polymer can be functionalized to contain both substituted alkyl ester and aryl ester functional groups. Typically, however, the functionalized hydrocarbon polymer employed in the process of the invention contains only one type of ester functionality; i.e., either substituted alkyl ester groups or aryl ester groups. The ester functional group in the functionalized hydrocarbon polymer is preferably an aryl ester functional group of formula (II). Preferably, Ar represents wherein X, each of which is the same or different, is an electron withdrawing group; T, each of which are the same or different, is a non-electron withdrawing group (e.g., electron donating); m and p are integers from 0 to 5. Preferably, m is from 1 to 5, and more preferably 1 to 3. Preferably, p is from 0 to 2, and more preferably 0 to 1. X is preferably selected from a halogen (especially F or Cl), $CF_3$, CN, and $NO_2$. T is preferably selected from alkyl, especially methyl or ethyl.

Particularly preferred aryl groups are difluorophenyl, dichlorophenyl, 4-methyldifluorophenyl, and 4-methyldichlorophenyl. Most preferred is 2,4-dichlorophenyl. Accordingly, particularly preferred aryl ester functional groups are difluorophenyl ester (e.g., 2,4-difluorophenyl ester), dichlorophenyl ester (e.g., 2,4-dichlorophenyl ester), 4-methyldifluorophenyl ester (e.g., 2,6-difluoro-4-methyl difluorophenyl ester), and 4-methyl dichlorophenyl ester (e.g., 2,6-dichloro-4-methyl dichlorophenyl ester). Most preferred is 2,4-dichlorophenyl ester.

The ester functional group may be directly attached to a carbon atom of the starting hydrocarbon polymer, or may be indirectly attached through a bridging group, depending upon the functionalization chemistry employed. For example, functionalization via Koch chemistry typically results in a functionalized hydrocarbon polymer in which the carbonyl moieties of the ester groups are directly attached to carbon atoms of the starting polymer (see below). On the other hand, functionalization via thermal "ene" addition (described below) results in indirect attachment. Regardless of the mode of attachment, the functionalized hydrocarbon polymer preferably contains at least about 50 mole %, more preferably at least about 60 mole %, and most preferably at least about 80 mole % neo ester functional groups (e.g., 90 to 99 mole % neo, or even about 100 mole % neo). A neo ester functional group is defined herein to mean that the ester functional group of formula (I) or formula (II) is attached to a tertiary carbon atom of the functionalized hydrocarbon polymer, wherein the tertiary carbon atom may be a carbon atom of the starting hydrocarbon carbon (i.e., direct attachment) or may be a carbon atom incorporated into the starting polymer via the functionalization chemistry (i.e., indirect attachment).

The functionalized hydrocarbon polymers used as reactants in the process of the invention can be prepared by any method capable of introducing substituted alkyl ester groups and aryl ester groups, as earlier described, into the starting hydrocarbon polymer. Suitable methods include, but are not limited to, (1) grafting the hydrocarbon polymer with a mono- or dicarboxylic ester reactant in the presence of a free radical initiator; (2) reacting the hydrocarbon polymer with a monounsaturated mono- or dicarboxylic ester via the thermal "ene" or halogen-assisted processes; and (3) functionalizing the unsaturated olefinic sites of a hydrocarbon polymer via the Koch reaction; i.e., with carbon monoxide in the presence of an acidic catalyst and at least one hydroxyaryl compound or at least one substituted alkyl hydroxy compound, or mixtures thereof.

Suitable carboxylic substituted alkyl ester reactants for grafting the starting hydrocarbon polymer include monounsaturated monocarboxylic reactants comprising at least one member selected from the group consisting of the monoun- saturated $C_3$ to $C_{12}$ monocarboxylic acid esters of substituted alkyl hydroxy compounds of formula (III):

$$H—O—Ak \qquad (III)$$

wherein Ak is a substituted alkyl group as defined above in formula (I). The carbon-carbon double bond may be conjugated to the carboxy group; i.e., of the structure or it may be non-conjugated; e.g., Exemplary monounsaturated monocarboxylic substituted alkyl ester reactants include hexafluoroisopropyl acrylate, hexafluoroisopropyl methacrylate, and hexafluoroisopropyl 2,2-dimethyl-3-butenoate.

Suitable carboxylic aryl ester reactants for grafting the starting hydrocarbon polymer include monounsaturated monocarboxylic reactants comprising at least one member selected from the group consisting of the monounsaturated $C_3$ to $C_{12}$ monocarboxylic acid esters of hydroxyaryl compounds of formula (IV):

$$H—O—Ar \qquad (IV)$$

wherein Ar is an aryl group as defined above in formula (II). The carbon-carbon double bond may be conjugated or non-conjugated as described above for the monocarboxylic substituted alkyl ester reactants.

Exemplary monounsaturated monocarboxylic aryl ester reactants include phenylacrylate, phenylmethacrylate, 2,4-dichlorophenylacrylate, 2,4-dichlorophenylmethacrylate, and the dichlorophenyl and difluorophenyl esters of 2-butenoic acid, 3-butenoic acid and 2,2-dimethyl-3-butenoic acid.

Alternatively, the hydrocarbon polymer can be grafted with a monounsaturated carboxylic non-ester reactant or a monounsaturated carboxylic ester reactant based on hydroxy compounds other than those of formula (III) or formula (IV), and then esterified with a substituted alkyl hydroxy compound of formula (III) or a hydroxyaryl compound of formula (IV). Suitable reactants include monounsaturated carboxylic reactants comprising at least one member selected from the group consisting of monounsaturated $C_3$ to $C_{12}$ monocarboxylic acids and derivatives thereof such as the esters of $C_1$ to $C_5$ alcohols, wherein the carbon-carbon double bond can be conjugated or non-conjugated as described above for the monocarboxylic ester reactants based on hydroxy compounds of formula (III) and formula (IV).

Exemplary monounsaturated monocarboxylic non-ester and ester reactants of the type described in the preceding paragraph include acrylic acid, methacrylic acid, 2-butenoic acid, 3-butenoic acid, 2,2-dimethyl-3-butenoic acid, and the lower alkyl (e.g., $C_1$ to $C_5$ alkyl) acid esters of the foregoing; e.g., methyl acrylate, methyl methacrylate, etc.

Conventional free radical initiators can be used for the grafting, including organic peroxides, hydroperoxides, and azo compounds. The grafting can be performed at elevated temperatures, optionally in solution. Grafting results in the random attachment of carboxylic acid producing moieties along the hydrocarbon polymer chains.

When carboxylic non-ester reactants or carboxylic ester reactants derived from alcohols other than those of formula (III) or formula (IV) are employed in the grafting reaction, the desired ester groups are introduced by reaction of the grafted polymer with a substituted alkyl hydroxy compound of formula (III) or a hydroxyaryl compound of formula (IV) via conventional esterification or trans-esterification techniques. This normally involves heating the polymer substituted with the carboxylic acid producing moieties and the hydroxy compound of formula (III) or formula (IV), optionally in the presence of a normally liquid, substantially inert organic solvent diluent and/or in the presence of an esterification catalyst.

The monounsaturated monocarboxylic ester and non-ester reactants described above as suitable for use in graft functionalization can also be employed to functionalize the starting hydrocarbon polymer via the thermal "ene" reaction or by halogen-assisted processes. These processes result in the addition of monocarboxylic reactant to the polymer, wherein the monounsaturation in the reactant becomes saturated. In the thermal "ene" process, the hydrocarbon polymer and the monounsaturated monocarboxylic reactant are contacted at elevated temperatures, generally with stirring and in the absence of $O_2$ and water, in a carboxylic reactant to polymer mole ratio of about 1:1 to 10:1. Thermal "ene" processes are described in U.S. Pat. No. 3,361,673 and U.S. Pat. No. 3,401,118.

In the halogen-assisted processes, the starting hydrocarbon polymer can be functionalized by first halogenating the polymer and then reacting the halogenated polymer with monounsaturated carboxylic reactant. Processes of this type are disclosed in, e.g., U.S. Pat. Nos. 3,087,436; 3,172,892 and 3,272,746. Alternatively the hydrocarbon polymer and the monounsaturated carboxylic reactant are mixed and heated while adding halogen (e.g., chlorine) to the mixture. Processes of this type are disclosed in U.S. Pat. Nos. 3,215,707, 3,231,587, 3,912,764 and 4,110,349.

When a monocarboxylic non-ester reactant or a monocarboxylic ester reactant based on an alcohol other than one of formula (III) or formula (IV) is employed, the hydrocarbon polymer substituted monocarboxylic acid producing material resulting from the thermal "ene" and halogen-assisted processes can then be reacted with a hydroxy compound of formula (III) or of formula (IV) according to conventional esterification or trans-esterification techniques, as discussed above with respect to graft functionalization.

The preferred method for functionalizing the starting hydrocarbon polymer is the Koch reaction. In the Koch process, a hydrocarbon polymer containing at least one carbon-carbon double bond is selectively functionalized at at least a portion of the double bond sites by contacting the polymer with carbon monoxide and a Koch catalyst, which is preferably a classical Broensted acid or a Lewis acid catalyst. The Koch reaction is conducted in a manner and under conditions such that an acylium cation is formed at the site of a carbon-carbon double bond wherein the acylium ion is in turn reacted with a nucleophilic trapping agent selected from the group consisting of water or at least one hydroxy containing compound, wherein water forms a carboxylic acid and alcohol forms a carboxylic ester. Preferably, the trapping agent is a hydroxy compound of formula (III) or formula (IV) such that the desired ester functional group directly attached to a carbon atom of the starting hydrocarbon polymer is formed in a single step. When water is used, the resulting directly attached carboxylic acid group must be esterified in a second step with a hydroxy compound of formula (III) or (IV) to give the desired functional group. If an alcohol other than a hydroxy compound of formula (III) or (IV) is used as the trapping agent (e.g., an aliphatic alcohol such as $C_1$ to $C_5$ alkyl alcohol), the resulting ester must be reacted with the desired hydroxy compound under trans-esterification conditions.

In the Koch process, carboxylic acid or carboxylic ester can be formed at moderate temperatures and pressures at the point of unsaturation of the hydrocarbon polymer. The polymer is maintained in a desired temperature range which is typically between −20° to 200° C. and preferably from 0° to 80° C. The pressure in the reactor can be maintained based on the CO source, with pressures up to 34,500 Pka (5,000 psig) with a preferred range of from 3,450 to 20,700 Pka (500 to 3,000 psig).

The relative amounts of reactants and catalyst and the reaction conditions are controlled in a manner sufficient to functionalize typically at least about 40, preferably at least 80, more preferably at least 90, and most preferably at least 95 mole % of the carbon-carbon double bonds present in the starting polymer.

The catalyst preferably has a Hammet Scale Value acidity ($H_o$) of less than −7, preferably from −8.0 to −11.5, in order to be sufficiently active, particularly to form neo structures. Useful catalysts include $H_2SO_4$, $BF_3$, and HF. The nucleophilic trapping agent is preferably added in combination with the catalyst as a catalyst complex. Preferred catalyst complexes include the complexes of $BF_3$ with the hydroxyaryl compounds of formula (IV), with a most preferred complex being $BF_3 \cdot 2,4$-dichlorophenol.

In the Koch process, a neo functional group (i.e., the acyl functional group is attached to a tertiary carbon atom of the polymer backbone) will generally result from an ethylenic double bond in which one of the carbon atoms of the double bond is fully substituted with hydrocarbyl groups. An iso functional group (i.e., the acyl functional group is attached to a secondary carbon atom of the polymer backbone) will generally result from an ethylenic bond in which each carbon in the double bond has one hydrogen substituent. Thus, terminal ethenylidene groups (earlier defined) in the polymer chain result in neo functional groups, and terminal vinyl will result in iso functional groups. As noted earlier, the functionalized hydrocarbon polymer reactant used in the process of the invention preferably has at least about 50 mole % neo functional groups.

Not all of the starting hydrocarbon polymer is necessarily functionalized via the functionalization chemistry employed. The weight fraction of functionalized hydrocarbon polymer based on the total weight of both functionalized and unfunctionalized polymer (commonly referred to as active ingredient or A.I.) may be any value greater than zero, up to and including 1, and is typically at least about 0.50, preferably from about 0.65 to 0.99, and more preferably from about 0.75 to 0.99. The unfunctionalized hydrocarbon polymer is generally not removed from the composition before or after the amidation of the functionalized polymer, because it is generally difficult and/or uneconomical in practice to effect such a separation.

The amine compounds useful as reactants in the process of the invention are those having at least one reactive —$NH_2$ moiety, i.e., amine compounds containing at least one primary amine group capable of reacting with the ester functional groups of the functionalized hydrocarbon polymer. The amines may be hydrocarbyl (i.e., alkyl, alkenyl, cycloalkyl, aryl, alkaryl, aralkyl, etc.) primary monoamines or hydrocarbyl polyamines wherein at least one of the amine groups in the polyamine is a primary amine. The amines may be hydrocarbyl amines as just described, but which contain other groups as well; e.g., hydroxy groups, alkoxy groups, etc.

A preferred amine reactant is an alkylene polyamine, especially an ethylene polyamine or a propylene polyamine. Non-limiting examples of suitable alkylene polyamines include diethylene triamine ("DETA"), triethylene tetramine ("TETA"), tetraethylenepentamine ("TEPA"), pentaethylene hexamine ("PEHA"), di-(1,3-propylene) triamine, di-(1,2-propylene) triamine, and penta-(1,2-propylene) hexamine. Mixtures of alkylene polyamines may also be used. For example, complex mixtures of alkylene amines, in which pairs of nitrogens are joined by alkylene groups, are prepared commercially by the reaction of alkylene dihalide (e.g., ethylene dichloride or propylene dichloride) with ammonia. Ethylene polyamine mixtures containing compounds such as DETA, TETA, TEPA and isomeric piperazines are produced thereby. Such mixtures may be used directly as the amine reactant or a distillation cut of such mixtures may be employed. Mixtures of ethylene polyamines averaging about 5 to 7 nitrogen atoms per molecule are available commercially under trade names such as "Polyamine H", "Polyamine 400", "Dow Polyamine E-100", etc.

The most preferred amine reactant is a heavy polyamine. As used herein, the term heavy polyamine refers to a relatively high molecular weight polyamine; i.e., a polyamine typically having an average molecular weight of at least about 230. The heavy polyamines are characterized by having little or no volatility under the conditions (described below) which may be employed in the process of the invention. An exemplary heavy polyamine is N-(N-(3-tallowalkylaminopropyl)-3-aminopropyl)-3-aminopropylamine, which is sold as Tallow Tetramine by Tomah Chemicals.

Preferred heavy polyamines are the heavy alkylene polyamines; i.e., alkylene polyamines, which have at least six, preferably at least seven, nitrogen atoms per molecule. Exemplary heavy alkylene polyamines are PEHA, hexaethylene heptamine, heptaethylene octamine, hexa-(1,2-propylene)heptamine and their branched isomers.

Mixtures of heavy alkylene polyamines may also be used. A particularly preferred amine reactant is a heavy ethylene polyamine composition comprising 0–20 wt. % PEHA and 100–80 wt. % of ethylene polyamines containing at least seven nitrogens per molecule. As noted above, mixtures of ethylene polyamines are prepared, for example, by reaction of ethylene dichloride and ammonia. The heavy polyamine is prepared by completely removing from such mixtures via distillation all of the lower boiling ethylene polyamine components up to and including TEPA. Only a small amount of PEHA (e.g., 1 to 15 wt. %) remains in the mixture, with the balance being ethylene polyamine molecules with a higher nitrogen content and also a greater degree of branching. A suitable heavy ethylene polyamine composition is available commercially from Dow Chemical under the tradename "Polyamine HA-2". Typical analysis of HA-2 gives primary nitrogen values of 7.8 meq of primary nitrogens per gram of polyamine, and a total nitrogen content of 32.4–32.8 wt. %.

Other suitable amine reactants include polyoxyalkylene polyamines (e.g., polyoxyethylene diamines, polyoxypropylene diamines, and polyoxypropylene triamines) and polyamido amines as disclosed in U.S. Pat. Nos. 4,857,217, 4,963,275 and 4,956,107.

In the process of the invention, the reaction between the functionalized hydrocarbon polymer containing ester groups (i.e., substituted alkyl ester functional groups and/or aryl ester functional groups) and the amine having at least one reactive —NH$_2$ moiety is carried out for a time and under conditions sufficient to form amide groups on the functionalized polymer with the concomitant release of hydroxy compound.

The reaction may be carried out at any suitable temperature; i.e., from the lowest temperature at which the amidation will proceed up to the temperature at which the reactants decompose. In practice, the reaction is generally carried out by heating the mixture at a temperature of from about 100° to 250° C., preferably from about 150° to 220° C., most preferably from about 180° to 200° C., for the time necessary to achieve the desired degree of conversion of ester functional groups to amide. The degree of conversion can be monitored by tracking the disappearance of the ester absorption band in the carbonyl region of the infrared spectrum. Typically, the reaction is run until the IR band has substantially to completely disappeared, which roughly corresponds to a conversion of at least about 95%, and generally about 98% to 100%.

The reaction time can vary widely depending upon a variety of factors including the reaction temperature and the desired degree of conversion. Generally, lower temperatures and higher conversions require longer times. Usually, reaction times of from about 2 to 30 hours (e.g., 5 to 25 hours) are employed.

The reaction may be conducted at any suitable pressure, from a partial vacuum to a pressure at or above atmospheric pressure, provided that the selected pressure is compatible with the choice of amine reactant and/or the method selected for removing the released hydroxy compound during the reaction. Thus, for example, a superatmospheric pressure will generally be required when a relatively volatile amine reactant is used in order to maintain a sufficient amount of the amine in the liquid reaction mixture. In such a case, the concurrent removal of released hydroxy compound would likely involve binding/deactivation, as hereinafter described, rather than stripping, as hereinafter described, in order to avoid the loss of amine reactant. On the other hand, when a relatively non-volatile amine is used, atmospheric or subatmospheric pressures can be employed and the hydroxy compound can be removed by stripping or by binding/deactivation.

Solvents which are inert to the reactants and to the resulting polymeric amide product may be employed in the process of the invention, provided that the solvent is not substantially removed along with the released hydroxy compound in the removing step. Thus, non-volatile mineral oils can be employed as solvent where, for example, the hydroxy compound is removed by stripping, as described below. Preferably, however, a solvent is not employed in order to avoid separating the solvent from the polymeric amide product in a post-reaction step. Of course, it should be understood that a solvent may sometimes be desirable, e.g., to facilitate temperature control during the reaction. Furthermore, in certain cases post-reaction solvent separation is not required; e.g., where the polymeric amide in mineral oil solvent can be used directly as a lubricating oil additive.

Generally, the amine employed in the reaction mixture is chosen to provide at least an equal number of equivalents of primary amine per equivalent of ester groups in the functionalized hydrocarbon polymer. More particularly, the total amount of amine charged to the mixture typically contains about 1 to 10, preferably about 1 to 6, more preferably about 1.1 to 2, and most preferably about 1.1 to 1.5 (e.g., 1.2 to 1.4) equivalents of primary amine per equivalent of ester groups. The excess of primary amine groups is intended to assure substantially complete conversion of the ester groups to amides.

It should be understood that polymeric amides having a wide range of properties and structures can be produced by the process of the invention. Thus, polymeric amides prepared from functionalized hydrocarbon polymers containing only one ester group per polymer chain and primary monoamines are typically composed of non-coupled, non-crosslinked polymeric amide. Coupled polymeric amides can be produced by the process of the invention by using a polyamine containing at least two reactive amine groups (i.e., two primary amine groups) and a monofunctionalized hydrocarbon polymer, wherein the polyamine acts as a coupling agent. Highly coupled and/or crosslinked polymeric amides can result from the reaction of functionalized hydrocarbon polymer containing at least 2 ester groups per chain and a polyamine. The skilled artisan will recognize that, where coupling or crosslinking is possible, the degree of coupling or crosslinking can be controlled in the process of the invention by suitable manipulation of reaction conditions in combination with controlling the relative number of reactive amine groups per ester functional group. As noted above, the polymeric amides produced by the process of the invention are typically used as oil soluble lubricating oil additives, such as dispersants. Accordingly, the conditions and reactant concentrations are preferably chosen such that the process of the invention produces polymeric amides which are substantially to completely free of crosslinking.

The hydroxy compound released from the ester functional groups in forming the polymeric amide is removed during the reaction. It has been observed that the presence in the reaction mixture of the hydroxy compound formed during amidation of the functionalized hydrocarbon polymer decreases the rate of amidation. It has also been observed that the presence of the hydroxy compound results in reduced conversion to the amide unless high temperature, long reaction times and/or a large excess of amine is utilized. The removal of the hydroxy compound during the reaction has been found to markedly increase conversion and to significantly shorten reaction time.

The improvements to the conversion and rate achieved by the removal of the hydroxy compound are both surprising and unexpected. A plausible reason for the enhancement of conversion and rate would be that the removal of hydroxy compound is shifting the equilibrium of a reversible reaction to favor the formation of amide over the ester. However, the amidation reaction has been found to be irreversible, as demonstrated by the observation that hydroxy compound fails to form an ester from the amidated polymer product under reaction conditions identical to those employed in the amidation. Another plausible reason for the retardation of rate would be that the removal of the acidic hydroxy compound prevents an acid-base reaction with the amine, which would reduce the amount of free amine nucleophile available for amidation. However, it has been observed that the addition of excess trialkyl amine to the reaction mixture, in order to scavenge the hydroxy compound and prevent or minimize its neutralization by the amine reactant, fails to accelerate the reaction rate. No other explanations for the observed conversion and rate benefits are immediately apparent.

Any method which can selectively remove the hydroxy compound from the reaction mixture is suitable for use in the process of the invention. Suitable removal methods include, but are not limited to, stripping the hydroxy compound from the mixture and binding or deactivating the hydroxy compound with a binding/deactivating agent. Stripping the hydroxy compound may be accomplished by sparging with an inert gas (e.g., nitrogen) with or without a partial vacuum, and by distillation with or without a vacuum. Where a partial vacuum is employed for stripping, whether for inert gas sparging or distillation, the pressure is typically in the range of from about 0.075 to 850 kPa (0.01 to 100 mm Hg), preferably from about 0.75 to 563 kPa (0.1 to 75 mm Hg), more preferably from about 7.5 to 375 kPa (1 to 50 mm Hg), most preferably from about 37.5 to 187.5 kPa (1 to 25 mm Hg); e.g., 37.5 to 112.5 kPa (5 to 15 mm Hg).

Removal by binding or deactivating the hydroxy compound constitutes addition of an agent to the reaction mixture which selectively interacts with the hydroxy compound to bind and/or deactivate the compound either physically (such as by selective adsorption) or chemically (such as by selective complexation), followed by removal of the bound/deactivated compound. The hydroxy compound may, for example, be removed by chemically binding the compound to a basic resin as a salt and then withdrawing the resin.

The removal method employed will depend in part on the choice of reactant and reactant conditions utilized to prepare the polymeric amide. Stripping can only be utilized if the hydroxy compound can be substantially volatilized at the temperatures and pressures employed during the reaction while at the same time the amine reactant is sufficiently non-volatile. The heavy polyamine reactants described earlier are typically non-volatile for the entire range of reaction conditions useful in the process of the invention, whereas the released hydroxy compounds are comparatively volatile. Accordingly, the released hydroxy compounds can usually be removed by stripping when heavy polyamines are employed as reactants. On the other hand, simple amine compounds of low molecular weight will typically be too volatile to permit the use of stripping. In such cases, removal by binding/deactivation is required. For amine reactants of intermediate volatility, stripping may or may not be appropriate, depending upon reaction temperatures and pressures. The skilled artisan can determine when and whether stripping is appropriate without undue experimentation. Where its use is suitable, however, stripping is the preferred method for removing released hydroxyaryl compound, and stripping by vacuum distillation is most preferred.

Whatever method is used, it is preferred to remove the hydroxy compound continuously during the entire reaction period. Nonetheless, substantial conversion and rate benefits can be achieved even if the removal is conducted for less than the entire reaction period. Thus, the released hydroxy compound may be removed during the first stages of the reaction (e.g., at least about 25% of the total reaction period) and not removed thereafter. The compound may also be removed intermittently at the beginning and end of the reaction period (e.g., a combined total of at least about 50% of the reaction period), but not in the middle. Nonetheless, the best results are typically obtained by continuous removal over the entire reaction The process of the invention will be further understood by the following examples which include preferred embodiments. In the following examples, $\overline{M}_n$ and the ethylene content of the polymers were determined by carbon-13 NMR; MWD by GPC; and end group content by proton NMR.

EXAMPLE 1 (COMPARATIVE)

An ethylene-butene-1 ("EB") copolymer prepared via metallocene-catalyst polymerization of the corresponding monomers ($\overline{M}_n$—3,300, MWD—2.4, ethylene content—45%, terminal vinylidene—65%) was functionalized via the Koch reaction with carbon monoxide and 2,4-dichlorophenol. 50 grams of the resulting 2,4-dichlorophenyl ester ($\approx$100% neo ester) was mixed with 2.05 grams of Polyamine HA-2 (Dow Chemical) ($\approx$1.2 equivalents of primary amine per equivalent of aryl ester) and heated with stirring at 150° C. for seven hours, during which time samples were periodically withdrawn and the conversion of ester to amide measured by the change in the intensity of the ester carbonyl IR band at 1,763 cm$^{-1}$.

EXAMPLE 2

The procedure of Example 1 was followed, except that the 2,4-dichlorophenol released during the amidation was removed by vacuum distillative stripping at 0.375 kPa (0.05 mm Hg).

Figure 1:
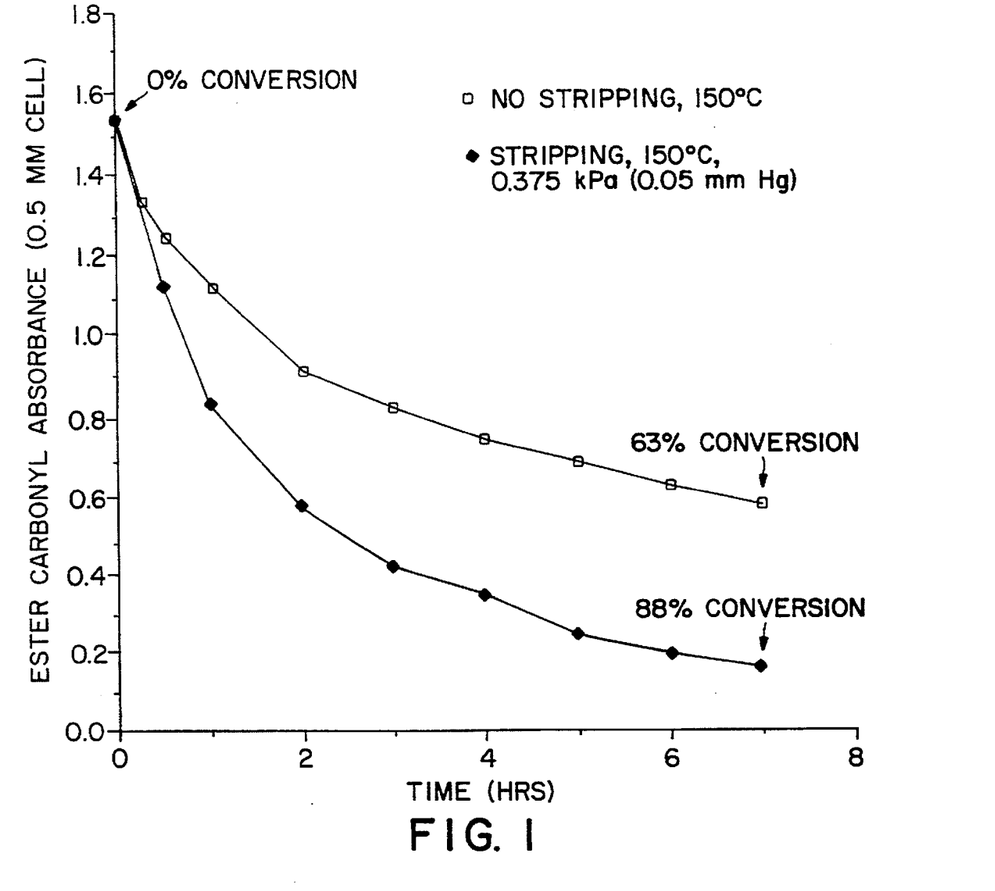
FIG. 1 shows the disappearance of the ester carbonyl absorption band at 1,763 $cm^{-1}$ (equivalent to ester conversion) versus reaction time for the amidations described in Examples 1 and 2.

Plots of conversion versus reaction time for Examples 1 and 2 are shown in FIG. 1.

EXAMPLE 3 (COMPARATIVE)

The procedure of Example 1 was followed, except that the reaction temperature was 180° C.

EXAMPLE 4

The procedure of Example 3 was followed, except that the released 2,4-dichlorophenol was removed by vacuum distillative stripping at 75 kPa (10 mm Hg).

Figure 2:
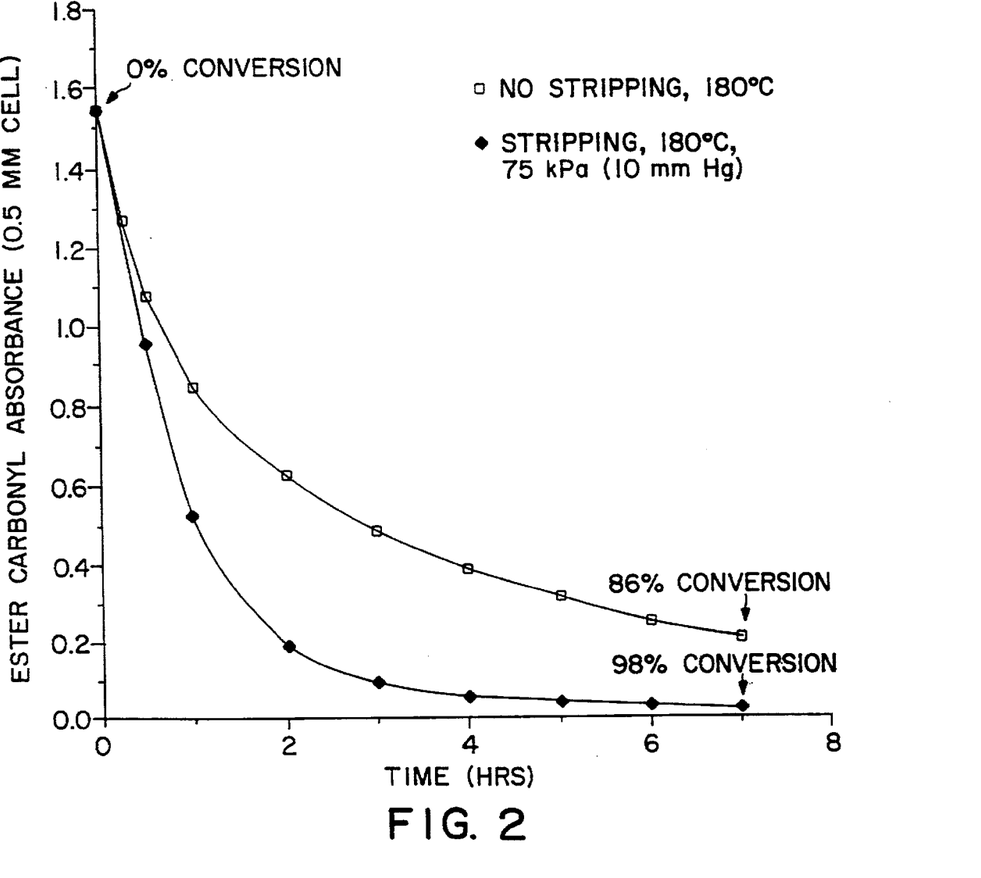
FIG. 2 shows the disappearance of the ester carbonyl absorption band at 1,763 $cm^{-1}$ versus reaction time for the amidations described in Examples 3 and 4.

Plots of conversion versus reaction time for Examples 3 and 4 are shown in FIG. 2.

EXAMPLE 5 (COMPARATIVE)

The procedure of Example 1 was followed, except that Polyamine HA-2 was replaced with 5.8 g of Tallow Tetramine (Tomah Chemical) ($\approx$1.2 equivalents of primary amine per equivalent of aryl ester).

EXAMPLE 6

The procedure of Example 5 was followed, except that the released 2,4-dichlorophenol was removed by vacuum distillative stripping at 0.375 kPa (0.05 mm Hg).

EXAMPLE 7

The procedure of Example 6 was followed, except the reaction temperature was 180° C.

Figure 3:
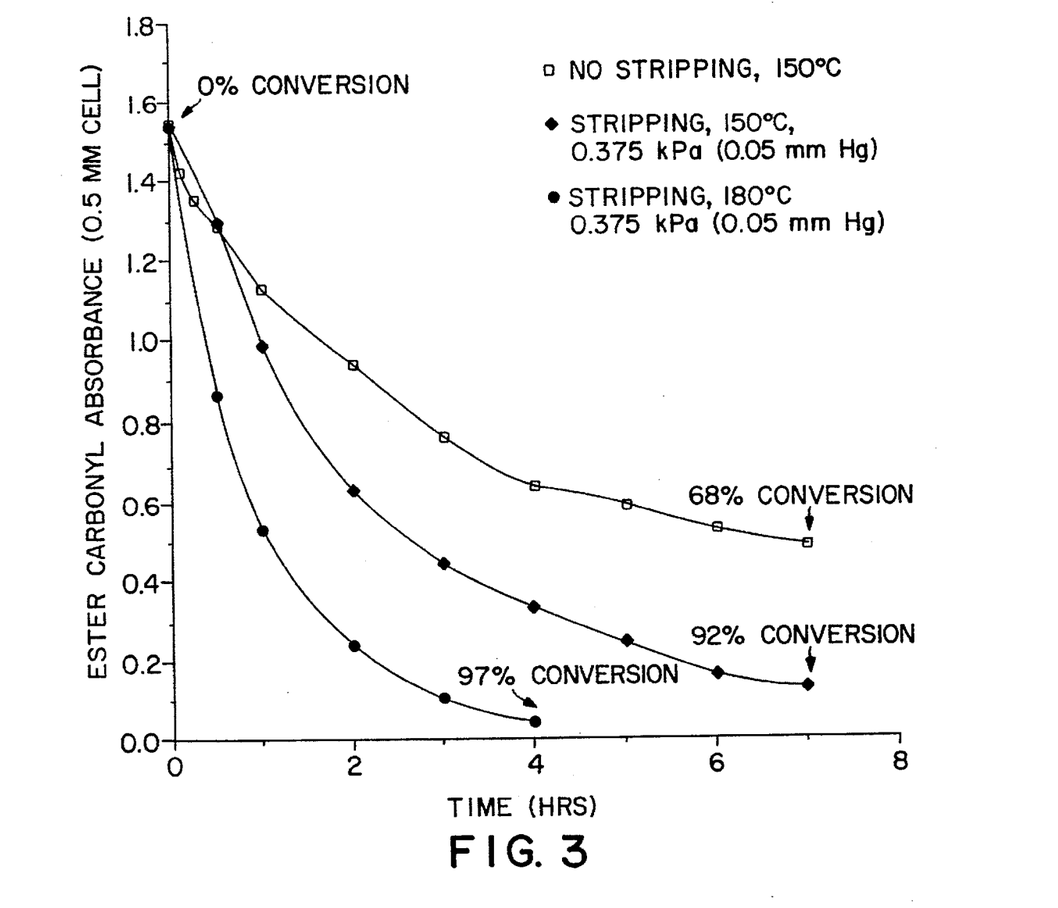
FIG. 3 shows the disappearance of the ester carbonyl absorption band at 1,763 $cm^{-1}$ versus reaction time for the amidations described in Examples 5 to 7.

Plots of conversion versus reaction time for Examples 5–7 are shown in FIG. 3.

EXAMPLE 8 (COMPARATIVE)

An EB copolymer as described in Example 1 was functionalized via the Koch reaction with carbon monoxide and hexafluoroisopropanol. 30 grams of the resulting hexafluoroisopropyl ester ($\approx$100% neo ester) was mixed with 4.68 grams of Polyamine HA-2 ($\approx$5.6 equivalents of primary amine per equivalent of ester) and heated with stirring at 180° C. for seven hours, during which time samples were periodically withdrawn and the conversion of ester to amide measured by the change in the intensity of the ester carbonyl IR band.

EXAMPLE 9

The procedure of Example 8 was followed, except that hexafluoroisopropanol released during the amidation was removed by vacuum distillation stripping at 75 kPa (10 mm Hg).

Figure 4:
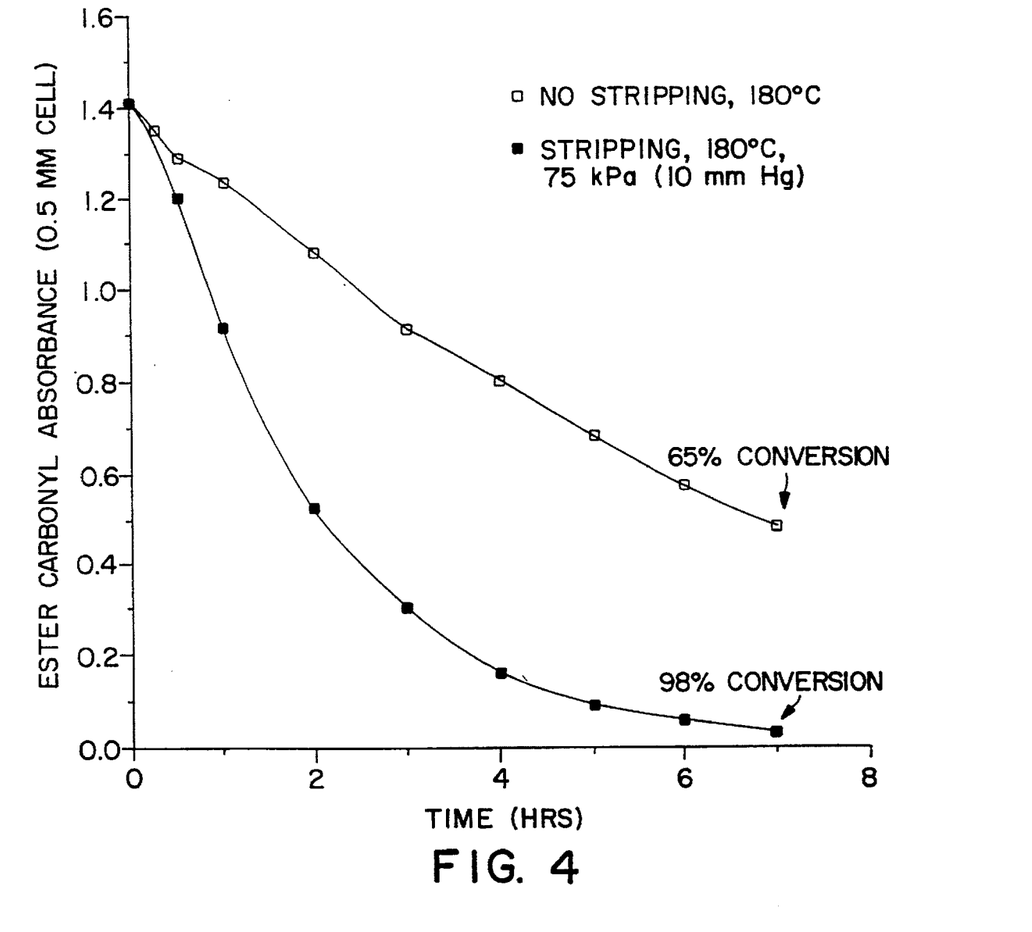
FIG. 4 shows the disappearance of the ester carbonyl absorption band versus reaction time for the amidations described in Examples 8 and 9.

Plots of conversion versus reaction time for Examples 8 and 9 are shown in FIG. 4.

Examples 1–9 demonstrate that the amidation reaction proceeded faster with significantly higher conversions at shorter reaction times when the hydroxy byproduct (2,4-dichlorophenol and hexafluoroisopropanol) was removed during the reaction, in comparison to the same reaction conducted without byproduct removal.

EXAMPLES 10–14

Several samples of the 2,4-dichlorophenyl ester of the EB copolymer described in Example 1 were amidated with Polyamine HA-2 (Dow Chemical) at 180° C., using the procedures noted in the following Table:

| Example No. | Procedure |
| --- | --- |
| 10 (Comparative) | Same as Example 3 |
| 11 | Same as Example 4 (continuous stripping) |
| 12 | Same as Example 4, except stripping was interrupted for 2 hours after the first hour of reaction |
| 13 | Same as Example 4, except stripping was stopped after two hours |
| 14 | Same as Example 4, except stripping was stopped after three hours |

Figure 5:
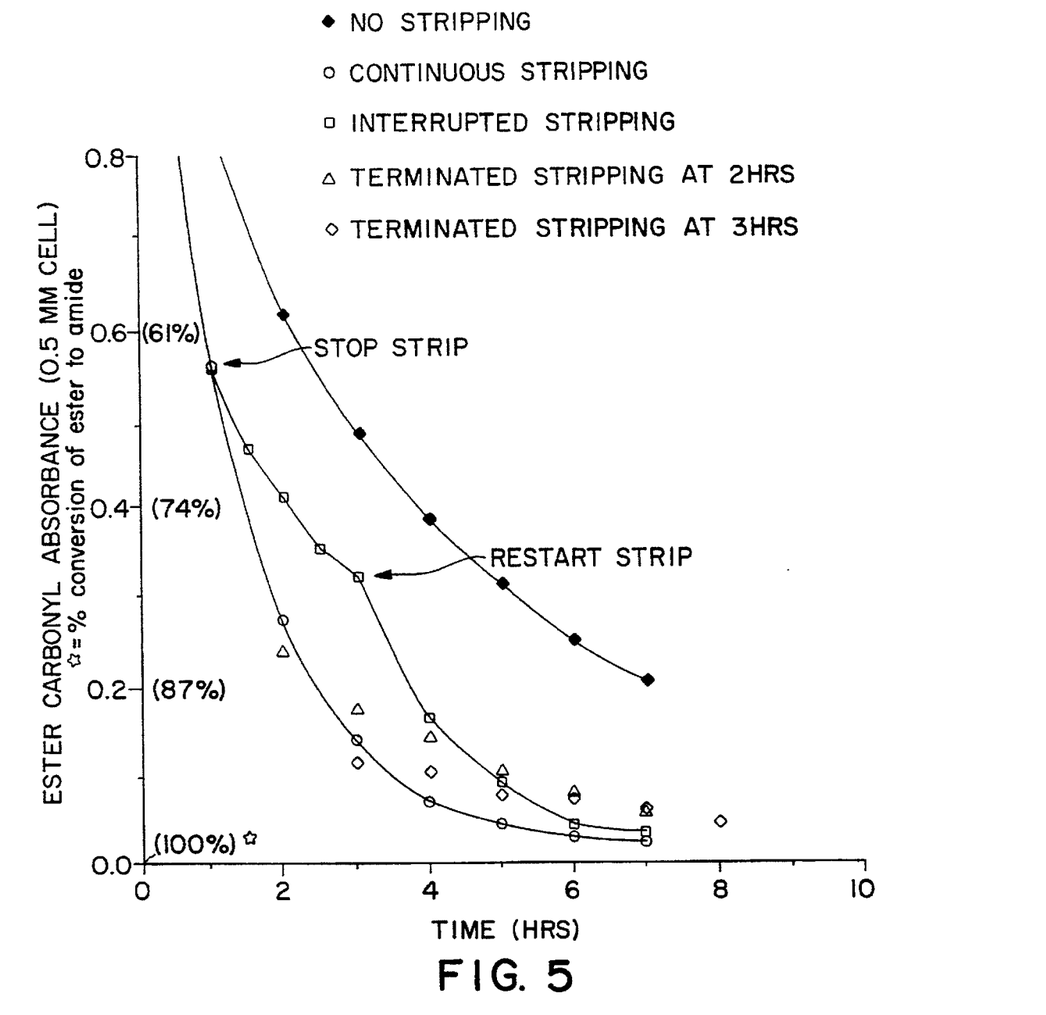
FIG. 5 shows the disappearance of the ester carbonyl absorption band at 1,763 $cm^{-1}$ versus reaction time for the amidations described in Examples 10 to 14.

Plots of conversion versus reaction time for Examples 10–14 are shown in FIG. 5.

Examples 10–14 demonstrate that achievement of the reaction rate and conversion benefits did not require the continuous removal of the released hydroxy compound over the entire reaction period. Instead, significant benefits were obtained when removal was conducted during only a part of the reaction period, particularly during the initial stages of the reaction. Nonetheless, continuous removal over the entire reaction period provided the best results.

What is claimed is:

1. A process for preparing a polymeric amide which comprises the steps of:
   (A) reacting a mixture of (1) functionalized hydrocarbon polymer containing ester functional groups comprising at least one member selected from the group consisting of
       (i) substituted alkyl ester functional groups of formula (I):

wherein Ak is a substituted, linear or branched $C_2$ to $C_{10}$ alkyl group containing at least one electron withdrawing substituent group, and
       (ii) aryl ester functional groups of formula (II):

wherein Ar is an aryl group selected from an aromatic radical or a substituted aromatic radical,
   wherein at least 50 mole % of the ester functional groups are neo ester functional groups, the hydrocarbon polymer having a number average molecular weight of at least about 500 prior to functionalization, and (2) an amine having at least one reactive —$NH_2$ moiety, for a time and under conditions sufficient to form amide groups; and
   (B) removing from the mixture during step (A) hydroxy compound released from the ester functional groups in forming the amide groups, the released hydroxy compound having a $pK_a$ of less than 12.

2. The process according to claim 1, wherein the amine comprises a heavy polyamine.

3. The process according to claim 1, wherein the amine comprises alkylene polyamine selected from the group consisting of ethylene polyamine, propylene polyamine and mixtures thereof.

4. The process according to claim 2, wherein the heavy polyamine comprises at least one heavy alkylene polyamine.

5. The process according to claim 4, wherein removing in step (B) comprises stripping the hydroxy compound from the mixture.

6. The process according to claim 5, wherein stripping comprises vacuum distillation.

7. The process according to claim 6, wherein the ester functional groups comprise an aryl ester functional group.

8. The process according to claim 7, wherein the aryl ester functional group comprises at least one member selected from the group consisting of phenyl ester and substituted phenyl esters.

9. The process according to claim 8, wherein the aryl ester functional group comprises at least one substituted phenyl ester selected from the group consisting of difluorophenyl esters, dichlorophenylesters, 4-methyldifluorophenyl esters, and 4-methyldichlorophenyl esters.

10. The process according to claim 9, wherein the substituted phenyl ester comprises 2,4-dichlorophenyl ester.

11. The process according to claim 6, wherein the ester functional groups comprise a substituted alkyl ester functional group.

12. The process according to claim 11, wherein the substituted alkyl ester functional group comprises a polyhaloalkyl ester functional group.

13. The process according to claim 12, wherein the polyhaloalkyl ester functional group comprises at least one member selected from the group consisting of polyfluoroalkyl ester functional groups.

14. The process according to claim 13, wherein the polyfluoroalkyl ester functional group comprises hexafluoroisopropyl ester functional group.

15. The process according to claim 2, wherein the hydrocarbon polymer prior to functionalization is selected from the group consisting of alpha-olefin homopolymers, alpha-olefin copolymers, ethylene-alpha-olefin copolymers, and mixtures thereof.

16. The process according to claim 15, wherein the hydrocarbon polymer comprises ethylene-alpha-olefin copolymer.

17. The process according to claim 16, wherein the ethylene-alpha-olefin polymer comprises ethylene-butene-1 copolymer.

18. The process according to claim 15, wherein the hydrocarbon polymer prior to functionalization is unsaturated, wherein at least about 30% of the polymer chains possess terminal ethenylidene unsaturation.

19. The process according to claim 1, wherein Ar is wherein X is an electron withdrawing group, each of which is the same or different; T is a non-electron withdrawing group, each of which is the same or different; and m and p are integers from 0 to 5.

20. The process according to claim 19, wherein X is halogen; T is methyl or ethyl; m is from 1 to 3; and p is from 0 to 1.

* * * * *